US008937464B2

(12) United States Patent
Wong et al.

(10) Patent No.: US 8,937,464 B2
(45) Date of Patent: Jan. 20, 2015

(54) HIGH VOLTAGE GENERATION SYSTEM AND METHOD EMPLOYING A CHARGE PUMP AND PRODUCING DISCRETE VOLTAGE VALUES

(75) Inventors: Yanyi L. Wong, Bellevue, WA (US); Agustinus Sutandi, Issaquah, WA (US)

(73) Assignee: Synopsys Inc., Mountain View, CA (US)

( * ) Notice: Subject to any disclaimer, the term of this patent is extended or adjusted under 35 U.S.C. 154(b) by 34 days.

(21) Appl. No.: 13/183,473

(22) Filed: Jul. 15, 2011

(65) Prior Publication Data

US 2013/0015831 A1    Jan. 17, 2013

(51) Int. Cl.
| | | |
|---|---|---|
| G05F 1/00 | (2006.01) |
| H02M 3/18 | (2006.01) |
| H02M 3/07 | (2006.01) |
| H01G 5/40 | (2006.01) |
| H02M 1/00 | (2006.01) |

(52) U.S. Cl.
CPC . H02M 3/07 (2013.01); H01G 5/40 (2013.01); *H02M 2001/0022* (2013.01)
USPC ............................................ 323/266; 363/59

(58) Field of Classification Search
USPC ......... 323/222, 223, 224, 225, 266, 282, 288, 323/311, 312, 313, 350, 351, 283, 268; 363/59, 60; 327/536; 307/109, 110
See application file for complete search history.

(56) References Cited

U.S. PATENT DOCUMENTS

| | | | | |
|---|---|---|---|---|
| 6,538,907 | B2 * | 3/2003 | Hoshino et al. | 363/60 |
| 7,432,752 | B1 * | 10/2008 | Lee et al. | 327/175 |
| 8,190,115 | B2 * | 5/2012 | Ojo et al. | 455/307 |
| 8,253,396 | B2 * | 8/2012 | Tanzawa | 323/267 |
| 2005/0258891 | A1 * | 11/2005 | Ito et al. | 327/538 |
| 2007/0194933 | A1 * | 8/2007 | Shanks et al. | 340/572.7 |
| 2009/0146719 | A1 * | 6/2009 | Pernia et al. | 327/291 |
| 2010/0181974 | A1 * | 7/2010 | Chen | 323/282 |
| 2010/0181982 | A1 * | 7/2010 | Chen et al. | 323/283 |
| 2010/0220421 | A1 * | 9/2010 | Wu | 361/93.1 |
| 2010/0321103 | A1 * | 12/2010 | David et al. | 327/551 |
| 2011/0069562 | A1 * | 3/2011 | Conte et al. | 365/189.09 |
| 2012/0249103 | A1 * | 10/2012 | Latham et al. | 323/282 |
| 2013/0002343 | A1 * | 1/2013 | Wong et al. | 327/536 |

* cited by examiner

*Primary Examiner* — Gary L Laxton
*Assistant Examiner* — Alex Torres-Rivera
(74) *Attorney, Agent, or Firm* — Kilpatrick Townsend & Stockton LLP (57) ABSTRACT

Voltage regulation in charge pumps. A high voltage generation system includes a charge pump having an output voltage node and a regulated input voltage node. The high voltage generation system also includes a voltage regulator. The voltage regulator includes a capacitive attenuator in electrical communication with the output voltage node. The voltage regulator also includes a comparator in electrical communication with the capacitive attenuator and with a reference voltage source. The voltage regulator further includes a buffer in electrical communication between the comparator and the regulated input voltage node.

23 Claims, 6 Drawing Sheets

HIGH VOLTAGE GENERATION SYSTEM AND METHOD EMPLOYING A CHARGE PUMP AND PRODUCING DISCRETE VOLTAGE VALUES

TECHNICAL FIELD

Embodiments of the disclosure relate to voltage regulation in charge pumps.

BACKGROUND

A non-volatile memory, for example a Random Access Memory (RAM), is used as secondary storage in a computing device. The non-volatile memory typically requires high voltage to perform different operations, for example programming and erasing operations of the non-volatile memory. However, if the high voltage or the rate of change of the high voltage exceeds a maximum pre-defined value, the non-volatile memory can be damaged. Hence, there is a need for a precise time varying high voltage signal.

A charge pump is used for generating the high voltage. The charge pump uses capacitive charge storage for developing high voltage signals. Output of the charge pump needs to be controlled by a regulating circuit such that a target voltage of the charge pump is attained at a correct slew rate. The slew rate can be defined as rate of change of voltage value during which output of the charge pump varies from a higher value to a nominal value or vice-versa. The higher value can be regarded as the high voltage signal value required for various operations on the non-volatile memories. The nominal value can be regarded as the output of the charge pump on absence of an input to the charge pump. If the slew rate increases at a high pace, the non-volatile memory can be damaged, and if the slew rate decreases at a low pace, the non-volatile memory can malfunction.

In light of the forgoing discussion, there is a need for the charge pump to generate high voltage signals having discrete values.

SUMMARY

Embodiments of the present disclosure described herein provide voltage regulation in charge pumps.

An example of a high voltage generation system includes a charge pump having an output voltage node and a regulated input voltage node. The high voltage generation system also includes a voltage regulator. The voltage regulator includes a capacitive attenuator in electrical communication with the output voltage node. The voltage regulator also includes a comparator in electrical communication with the capacitive attenuator and with a reference voltage source. The voltage regulator further includes a buffer in electrical communication between the comparator and the regulated input voltage node.

An example of a method of generating discrete high voltage values includes generating an attenuated signal from an output voltage of a charge pump by using an attenuation factor. The method also includes comparing the attenuated signal with a reference voltage to provide an output. The method further includes providing an output signal to input of the charge pump in response to the output. Further, the method includes regulating the output voltage of the charge pump based on the input to the charge pump.

An example of a computer program product stored on a non-transitory computer-readable medium that when executed by a processor, performs a method of generating discrete high voltage values includes generating an attenuated signal from an output voltage of a charge pump by using an attenuation factor. The computer program product also includes comparing the attenuated signal with a reference voltage to provide an output. The computer program product further includes providing an output signal to input of the charge pump in response to the output. Further, the computer program product includes regulating the output voltage of the charge pump based on the input to the charge pump.

An example of a high voltage generation system for generating discrete high voltage values includes a charge pump that generates an output voltage at an output voltage node. The high voltage generation system also includes a voltage regulator that compares the output voltage with a reference voltage. The voltage regulator includes a capacitive attenuator that generates an attenuated signal from the output voltage by using an attenuation factor. The voltage regulator also includes a comparator that compares the attenuated signal with the reference voltage. The voltage regulator further includes a buffer that provides an output signal to a regulated input voltage node of the charge pump, based on output of the comparator, to enable regulation of the output voltage.

DETAILED DESCRIPTION OF THE EMBODIMENTS

Figure 1:
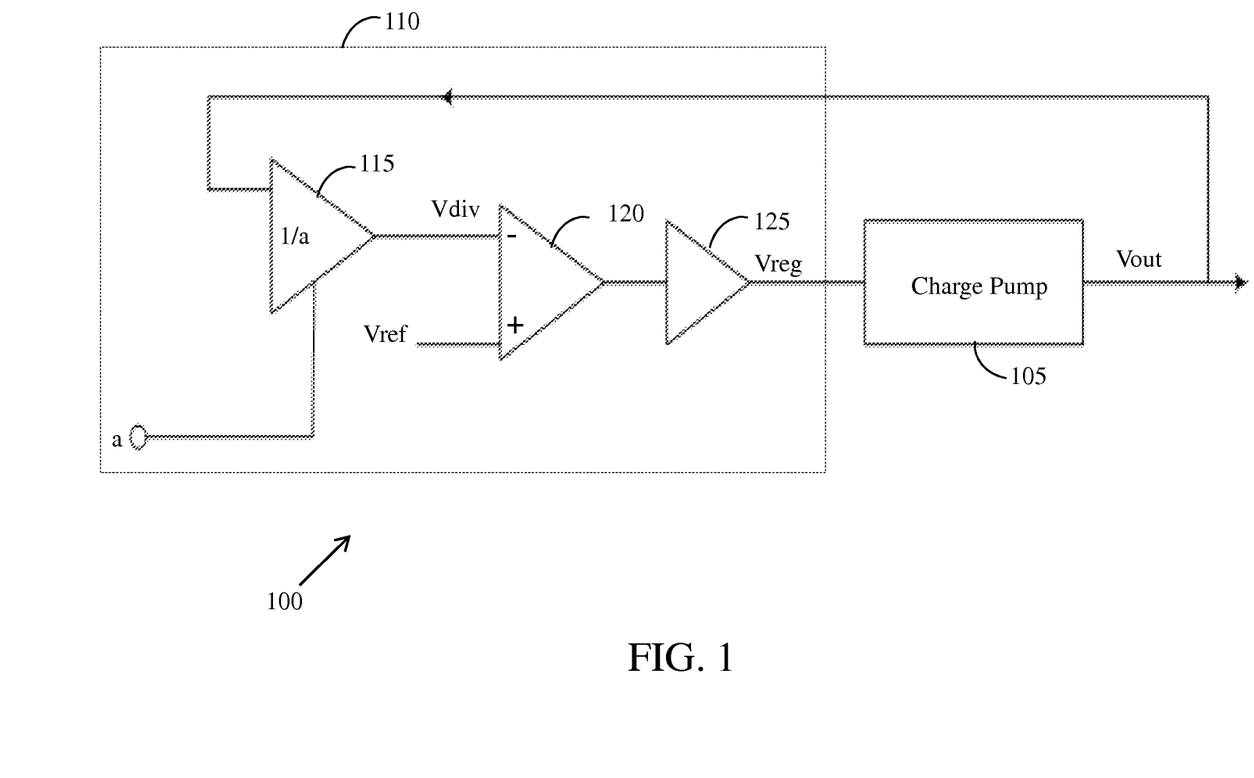
FIG. 1 is a block diagram of a high voltage generation system for generating discrete high voltage values, in accordance with one embodiment.

FIG. 1 is a block diagram of a high voltage generation system 100 for generating discrete high voltage values, in accordance with one embodiment. The high voltage generation system 100 includes a charge pump 105 and a voltage regulator 110. The charge pump 105 is defined as a device that uses capacitive charge storage to develop a high voltage at its output. The high voltage is used to erase or re-write non-volatile memories. The voltage regulator 110 further includes a capacitive attenuator 115, a comparator 120, and a buffer 125 in a series connection.

The capacitive attenuator 115 includes a plurality of capacitors. The capacitive attenuator 115 also includes one or more switches. The capacitive attenuator 115 is described in detail in conjunction with FIG. 2.

The charge pump 105 has an output voltage node and a regulated input voltage node. The capacitive attenuator 115 has an input in communication with the output voltage node of the charge pump 105 and an output in communication with a negative input of the comparator 120. The comparator 120 has a positive input in communication with a reference voltage source. The buffer 125 is coupled between output of the comparator 120 and the regulated input voltage node.

The voltage regulator 110 is used to compare an output voltage (Vout) of the charge pump 105 with a reference voltage (Vref) from the reference voltage source. Vout, provided by the charge pump 105 at the output voltage node, is provided as the input to the capacitive attenuator 115. The capacitive attenuator 115 is used to generate an attenuated signal Vdiv from Vout using a predefined attenuation factor 'a'. Vdiv is provided to the negative input of the comparator 120 and Vref is provided to the positive input of the comparator 120. Vref is a stabilized signal representing, in one example, a band gap voltage.

The comparator 120 compares Vdiv with Vref. If Vdiv is less than Vref, then the output of the comparator 120 reaches a supply voltage (Vdd). Further, if Vdiv is greater than Vref, then the output of the comparator 120 reaches a common return or a ground voltage (Vss).

The output of the comparator 120 is provided as input to the buffer 125. The buffer 125 is used to eliminate non-ideal behavior present in the comparator 120. In one example, the buffer 125 can be of Schmitt Trigger type or of inverter based type.

The buffer 125 provides an output signal Vreg at the regulated input voltage node. The buffer 125 ensures that Vreg is connected to either the supply voltage or the ground voltage. Vreg is used for regulating voltage of the charge pump 105 and is dependent on values of Vdiv and Vref. Vreg is at logic level HIGH when Vdiv is less than Vref. Vdiv being less than Vref indicates that Vout has a value that is less than what is indicated by the capacitive attenuator 115 setting a factor 'a'. Hence, Vreg at logic level HIGH can be used for increasing Vout. Due to logic level HIGH of Vreg, Vout is increased by the charge pump 105 until Vdiv is equal to Vref.

The charge pump 105 performs regulation of voltage at the output voltage node depending on Vreg. The charge pump 105 can use a capacitive charge to develop high voltage Vout at the output voltage node. Vout generated by the charge pump 105 is further used to perform actions, for example erase, rewrite and programming actions, on the non-volatile memories. Vout corresponds to the high voltage output of the charge pump 105.

Figure 2:
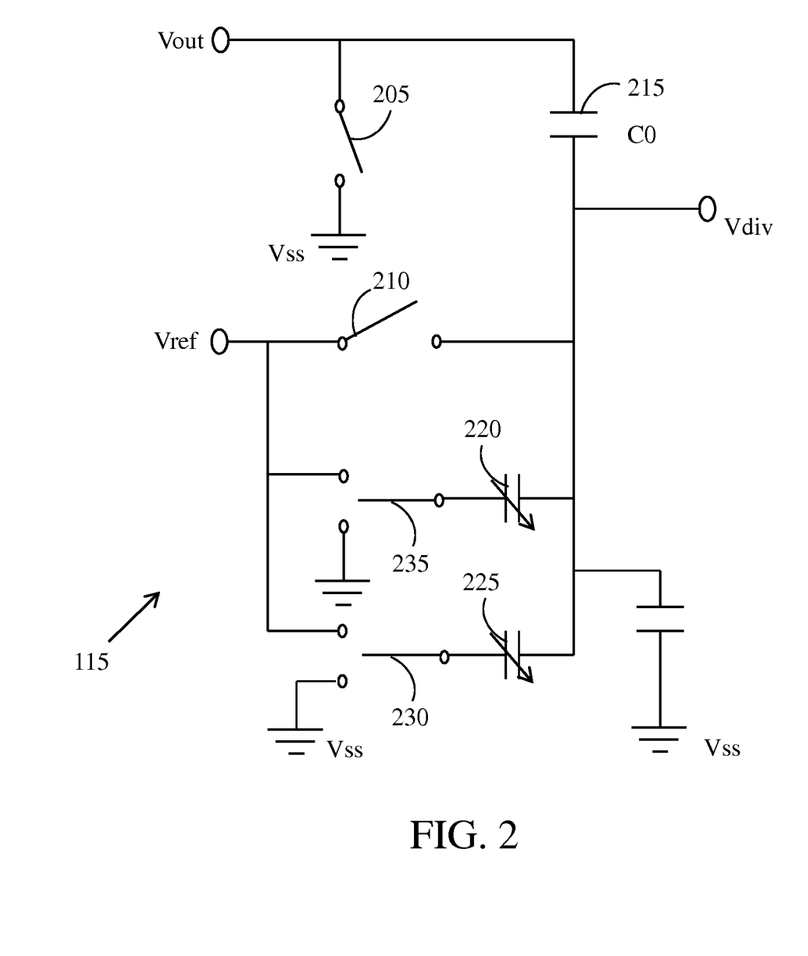
FIG. 2 illustrates a circuit diagram of a capacitive attenuator, in accordance with one embodiment.

FIG. 2 illustrates a circuit diagram of the capacitive attenuator 115, in accordance with one embodiment. The capacitive attenuator 115 includes a first mode switch 205, hereinafter referred to as a switch 205, a second mode switch 210, hereinafter referred to as a switch 210, a first capacitor 215, a first variable capacitor 220, a second variable capacitor 225, a switch 230, and a switch 235.

The first capacitor 215 is in electrical communication with the output voltage node that receives Vout, and the comparator 120 that receives Vdiv. The first variable capacitor 220 is in electrical communication with the comparator 120, and in switchable electrical communication with the reference voltage source that provides Vref and Vss. The second variable capacitor 225 is in electrical communication with the comparator 120, and in switchable electrical communication with the reference voltage source and Vss.

The first variable capacitor 220 represents a first plurality of capacitors, for example $C_{11}, C_{12}, \ldots C_{1n}$. The second variable capacitor 225 represents a second plurality of capacitors, for example $C_{21}, C_{22}, \ldots C_{2m}$. Charge held by the capacitors $C_{11}, C_{12}, \ldots C_{1n}$ (not shown) are controlled using control voltages $V_{11}, V_{12}, \ldots V_{1n}$ (not shown) respectively. Further, charge held by the capacitors $C_{21}, C_{22}, \ldots C_{2m}$ (not shown) are controlled using control voltages $V_{11}, V_{22}, \ldots V_{2m}$ (not shown) respectively. The control voltages $V_{11}, V_{12}, \ldots V_{1n}$ can have a voltage value of either Vss or Vref. A vector of the control voltages $[V_{11}, V_{12}, \ldots, V_{1n}, V_{21}, V_{22}, \ldots, V_{2m}]$ represents value of the attenuation factor 'a' of the capacitive attenuator 115.

In some embodiments, first variable capacitor 220, the second variable capacitor 225, the first plurality of capacitors, and the second plurality of capacitors include voltage-controlled capacitors, for example varactors.

Vout serves as input to the capacitive attenuator 115. The capacitive attenuator 115 can be subjected to either a pre-charge cycle or an enable mode. The pre-charge cycle can also be referred to as a reset mode. During the pre-charge cycle the switch 205 and the switch 210 are closed. The control voltages $[V_{11}, V_{12}, \ldots V_{1n}, V_{21}, V_{22}, \ldots, V_{2m}]$ have voltage values equal to Vref. Closing the switch 210 ensures that Vdiv is also equal to Vref (Vdiv=Vref). Hence, the voltage across the capacitors $C_{11}, C_{12}, \ldots C_{1n}, C_{21}, C_{22}, \ldots C_{2m}$, and the charge stored therein is zero. In the pre-charge cycle, Vout is grounded due to closure of the switch 205.

When Vdiv=Vref, the first capacitor 215 starts charging. The first capacitor 215 has a capacitance value of $C_0$. At end of the pre-charge cycle, the first capacitor 215 stores the charge of value $Q_0$ as $Q_0=C_0 V_{ref}$). The enable mode commences at the end of the pre-charge cycle. During the enable mode, the switch 205 and the switch 210 are opened. When the switch 205 and the switch 210 are opened, the control voltages $[V_{11}, V_{12}, \ldots, V_{1n}, V_{21}, V_{22}, \ldots, V_{2m}]$ are held at different voltage values selected from 0 Volts or Vref. The different voltage values correspond to a different attenuation factor 'a' for the capacitive attenuator 115. The different voltage values momentarily alter the voltage value of Vdiv.

When the control voltages $[V_{11}, V_{12}, \ldots, V_{1n}, V_{21}, V_{22}, \ldots, V_{2m}]$ are held at the different voltage values, the charge $Q_0$ present on the first capacitor 215 is redistributed to the capacitors $C_{11}, \ldots C_{1n}$ and $C_{21}, \ldots, C_{2m}$. Such charge redistribution causes momentary drop in voltage value of Vdiv. The momentary drop is rapidly regained due to the feedback loop of FIG. 1 that includes the capacitive attenuator 115. The feedback loop increases the voltage value of Vout and Vdiv until the voltage value of Vdiv matches the voltage value of Vref. The momentary drop in voltage value of Vdiv causes Vout to attain a different voltage value using equation (1) given below:

$$V_{out,different} = -(1/C_0)\left(\sum_{k=1}^{n} C_{1k}\Delta V_{1k} + \sum_{k=1}^{m}\sum_{k=1}^{m} C_{2k}\Delta V_{2k}\right) \quad (1)$$

where, $\Delta V_{1k}$ is equal to a difference between control voltage $V_{1k}$ during the reset mode and the control voltage $V_{1k}$ during the enable mode ($\Delta V_{1k}=V_{1k,enable\ mode}-V_{1k,\ reset\ mode}$).

Vout can attain discrete high voltage values based on the capacitor values of the first variable capacitor 220 that includes the capacitors ranging from $C_{11}, C_{12}, \ldots C_{1n}$, and the capacitor values of the second variable capacitor 225 that includes the capacitors ranging from $C_{21}, C_{22}, \ldots, C_{2m}$.

In one example, if the capacitive attenuator 115 is subjected to the enable mode and value of capacitor $C_{11}$ is equal to $2C_0$, then the control voltage $V_{11}$ corresponding to the capacitor $C_{11}$ is brought to zero Volts, and other control voltages from $V_{11}, V_{12}, \ldots, V_{1n}$ continue at respective pre-charge mode voltage of Vref.

Subsequently, value of $\Delta V_{1k}=\Delta V_{2k}=0$ for each k except $\Delta V_{11}$, which equals $-V_{ref}$. Substituting values of $\Delta V_{1k}=\Delta V_{2k}=0$ for $k\neq 1$ and $\Delta V_{11}=-V_{ref}$ in equation (1) provides the voltage value of Vout as given below in equation (2):

$$V_{out}=1/C_0(-C_{11}V_{ref})=2V_{ref} \quad (2)$$

From equation (2), Vout attains the voltage value equal to $2V_{ref}$ when the control voltage $V_{11}=0$. Similarly, by programming the control voltages $V_{12}, V_{12}, \ldots, V_{1n}$, Vout can obtain various voltage values in multiples of the voltage value of Vref. Vout having the various voltage values in multiples of Vref represents the discrete high voltage values required for performing different operations on the non-volatile memories.

In some embodiments, Vout can attain the discrete high voltage values based on the capacitor values of the first variable capacitor 220 that includes the capacitors ranging from $C_{11}, C_{12}, \ldots C_{1n}$ connected to the first plate of the first capacitor 215, and the capacitor values of the second variable capacitor 225 that includes the capacitors ranging from $C_{21}, C_{22}, \ldots, C_{2m}$ connected to the second plate of the first capacitor 215.

In one example, if the capacitive attenuator 115 is subjected to the enable mode and the value of $C_{11}$ is equal to 0.5 $C_0$, $C_{12}$ is equal to $C_0$, and $C_{12}$ is equal to $2C_0$, then the following statements are true:

1. At the reset mode and the enable mode, if the control voltages $V_{11}, V_{12}, \ldots V_{1n}$ and $V_{21}, V_{22}, \ldots V_{2m}$ have voltage values equal to Vref, then the voltage value of Vout is equal to zero.
2. At the reset mode, the control voltages $V_{11}, V_{12}, \ldots V_{1n}$ and $V_{21}, V_{22}, \ldots V_{2m}$ have voltage values equal to Vref. At the enable mode, if $V_{11}$ is equal to zero volts and $V_{12}$, $V_{13}$, and other control voltages have the voltage values equal to Vref, then the voltage value of Vout is equal to $0.5 V_{ref}$.
3. At the reset mode, the control voltages $V_{11}, V_{12}, \ldots V_{1n}$ and $V_{21}, V_{22}, \ldots V_{2m}$ have voltage values equal to Vref. At the enable mode, if $V_{12}$ is equal to zero volts and $V_{11}$, $V_{13}$, and other control voltages have the voltage values equal to Vref, then the voltage value of Vout is equal to $V_{ref}$.
4. At the reset mode, the control voltages $V_{11}, V_{12}, \ldots V_{1n}$ and $V_{21}, V_{22}, \ldots V_{2m}$ have voltage values equal to Vref. At the enable mode, if $V_{11}$ and $V_{12}$ are equal to zero volts and $V_{13}$ and the other control voltages have the voltage values equal to Vref, then the voltage value of Vout is equal to $3/2 V_{ref}$.
5. At the reset mode, the control voltages $V_{11}, V_{12}, \ldots V_{1n}$ and $V_{21}, V_{22}, \ldots V_{2m}$ have voltage values equal to Vref. At the enable mode, if $V_{13}$ is equal to zero volts and $V_{11}$ and $V_{12}$ and the other control voltages have the voltage values equal to Vref, then the voltage value of Vout is equal to $2V_{ref}$.

Hence, Vout can attain various discrete high voltage values by programming each of the control voltages to be equal to Vref or by connecting each of the control voltages to Vss.

Figure 3:
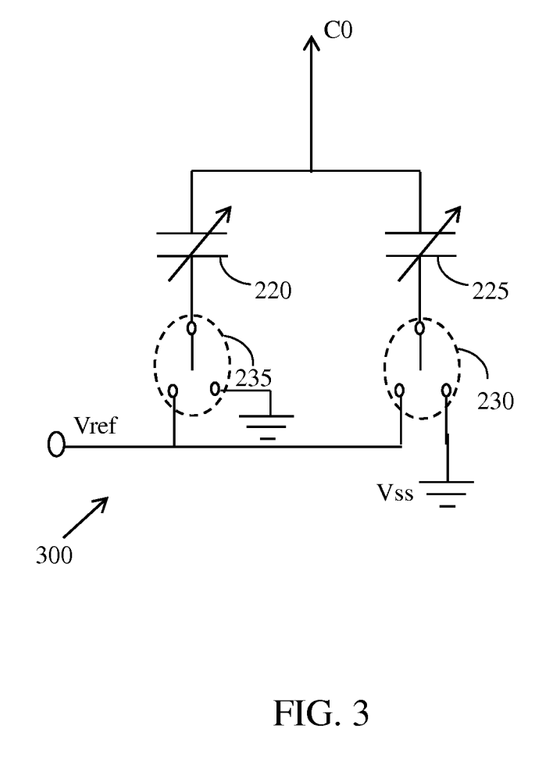
FIG. 3 illustrates a capacitor circuit present in a capacitive attenuator, in accordance with one embodiment.

FIG. 3 illustrates a capacitor circuit 300 present in the capacitive attenuator 115, in accordance with one embodiment. The capacitor circuit 300 includes the first variable capacitor 220, the second variable capacitor 225, the switch 230, and the switch 235.

The first variable capacitor 220 represents or is equivalent to a first plurality of capacitors, for example $C_{11}, C_{12}, \ldots C_{1n}$. The second variable capacitor 225 represents or is equivalent to a second plurality of capacitors, for example $C_{21}, C_{22}, \ldots C_{2m}$. The first variable capacitor 220 can be connected to Vref during a pre-charge cycle and to zero Volts during an enable mode. The switch 230 can be used to connect the second variable capacitor 225 to Vref and to Vss as desired. During the pre-charge cycle, the first capacitor 215 begins to charge. When Vdiv becomes equal to Vref, then the increase in the voltage value of Vout decreases. During the enable mode, the second variable capacitor 225 can be connected to Vss using the switch 230. Similarly, the switch 235 can be used to connect the first variable capacitor 220 to Vref and to Vss as desired.

Figure 4:
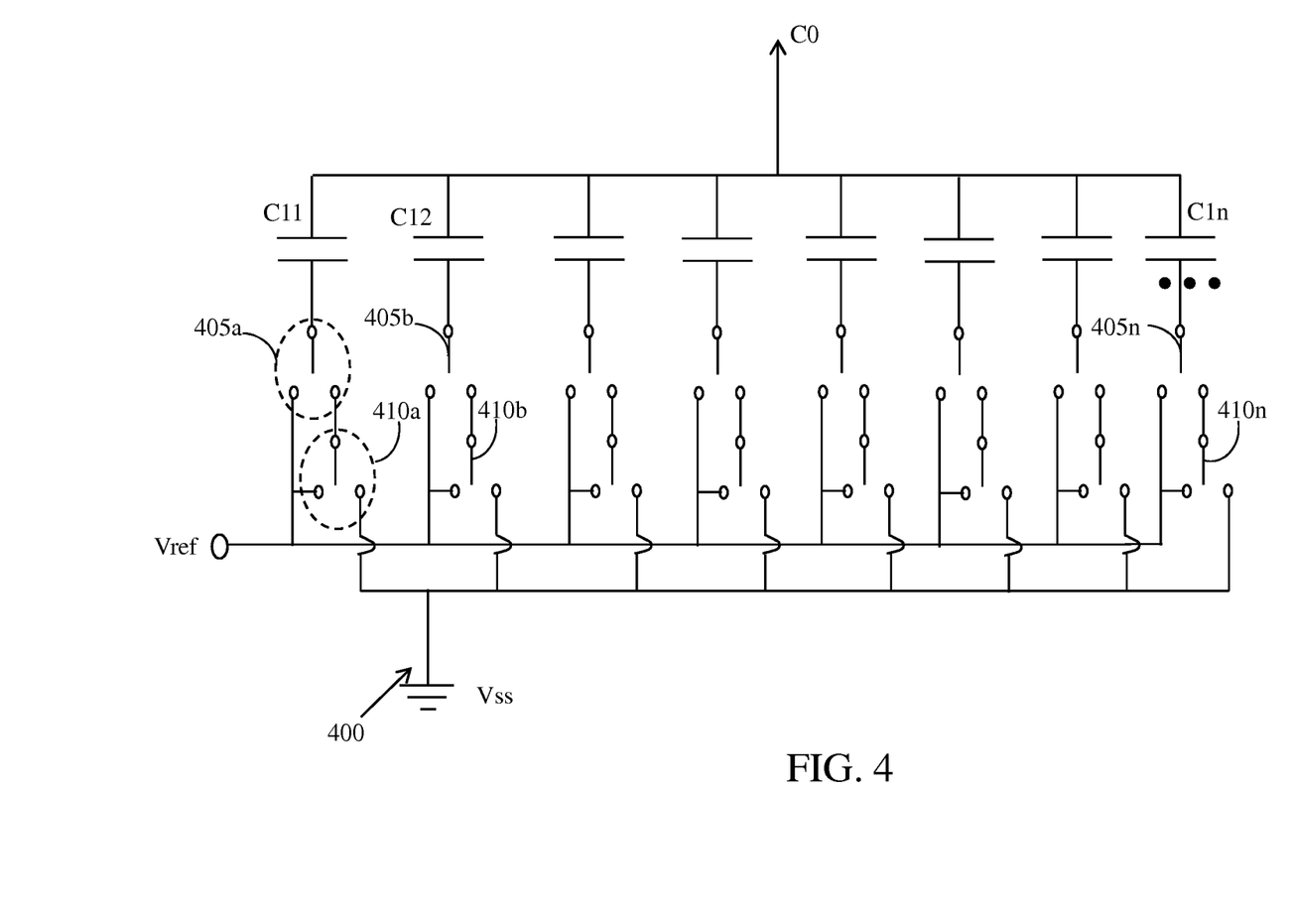
FIG. 4 illustrates a capacitor circuit present in a capacitive attenuator, in accordance with another embodiment.

FIG. 4 illustrates a capacitor circuit 400 present in the capacitive attenuator 115, in accordance with another embodiment. The capacitor circuit 400 is electrically equivalent to the capacitor circuit 300. The capacitor circuit 400 includes the capacitors $C_{11}, C_{12}, \ldots C_{1n}$ which is equivalent to the capacitors $C_{21}, C_{22}, \ldots C_{2m}$ a plurality of switches, for example a switch 405a, a switch 405b, and a switch 405n, connected to Vref, and a plurality of user-programmable switches, for example a switch 410a, a switch 410b, and a switch 410n, connected to Vss.

During the pre-charge cycle, the switch 405a is connected to Vref and since Vdiv also equals Vref during the pre-charge cycle, the capacitor $C_{11}$ carries zero charge at end of the pre-charge cycle. During enable mode, the control voltage $V_{11}$, that controls the switch 410a, can be used to generate a suitable high voltage signal Vout at the output of the charge pump 105. Each of the capacitors operate similarly. The capacitors are equivalent to the first variable capacitor 220. The switch 405b and similar switches can be used to establish connection of the corresponding capacitors with Vref. Vout is thereby regulated at the output of the charge pump 105.

During the enable mode, the switch 410a is connected to Vss. Connecting the switch 410a to Vss allows the capacitor 215 to discharge the charge stored during the pre-charge cycle. Upon discharging, the charge stored in the first capacitor 215 is redistributed to the capacitor $C_{11}$. Such re-distribution of the charge causes Vdiv to momentarily drop below the voltage value of Vref. The drop in the voltage value of Vdiv causes the feedback loop of FIG. 1 to change the voltage value of Vout; thereby Vout attains a different voltage value as indicated in equation (1). Each of the capacitors operate similarly. The capacitors are equivalent to the second variable capacitor 225. Similarly, the switch 410b and similar switches can be used for connecting associated capacitors to Vss.

In some embodiments, the switch 405a, the switch 405b, the switch 405n, the switches 410a, the switch 410b, and the switch 410n are one of metal oxide semiconductor switching transistors and solid state switching devices. The metal oxide semiconductor switching transistors can be in electrical communication with a user-controlled programming signal.

Figure 5:
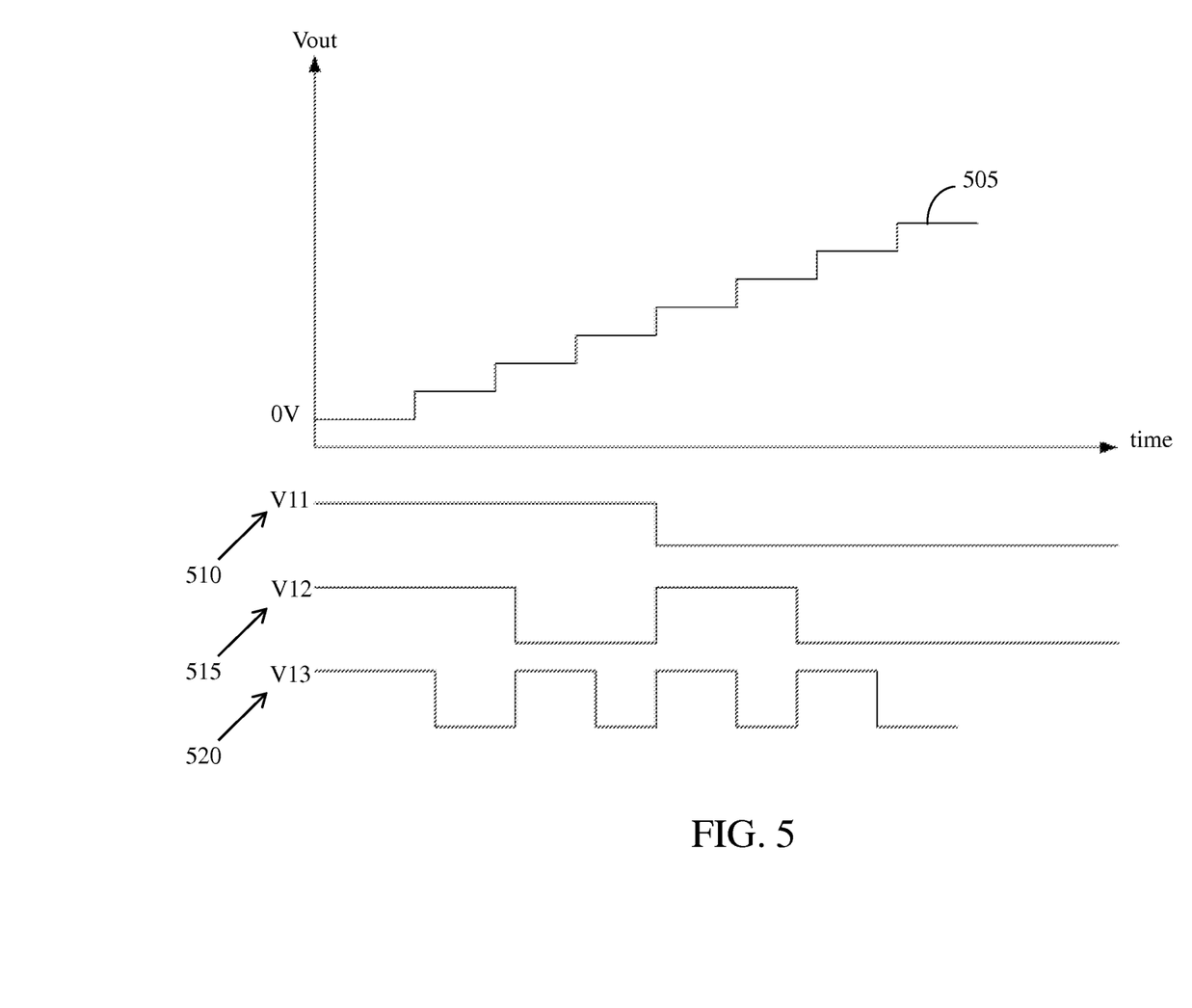
FIG. 5 is a timing diagram illustrating high voltage regulation in a high voltage generation system, in accordance with one embodiment.

FIG. 5 is a timing diagram illustrating the high voltage regulation in the high voltage generation system 100, in accordance with one embodiment. A step waveform 505 illustrates voltage level of Vout with respect to time. The step waveform 505 is compared using a set of control voltages. Signals, for example a signal 510, a signal 515, and a signal 520, are associated with the set of control voltages, for example and $V_{11}, V_{12},$ and $V_{13}$. The capacitors associated with the control voltages are sized such that $C_{11}=2*C_{12}=4*C_{12}$. Also $\Delta V_{1k}=\Delta V_{2k}=-V_{ref}$.

The control voltages are set such that the output voltage Vout steps through consecutive integral multiples of a least quantum of voltage. By providing sufficient time in between updates to the control voltages, output slew rate can be maintained at a desired rate. Hence, by changing vectors of the control voltages, a controlled step up of Vout occurs through multiple discrete voltage levels.

Figure 6:
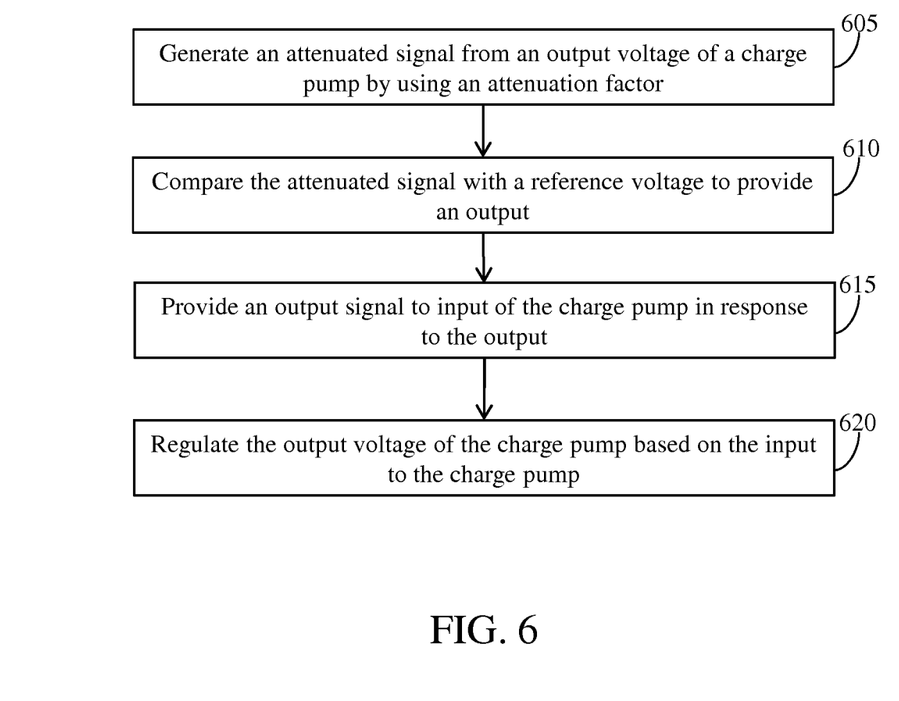
FIG. 6 is a flow diagram illustrating a method of generating discrete high voltage values, in accordance with one embodiment.

FIG. 6 is a flow diagram illustrating a method of generating discrete high voltage values, in accordance with one embodiment.

At step 605, an attenuated signal (Vdiv) is generated from an output voltage of a charge pump, for example the charge pump 105, by using an attenuation factor, for example a predefined attenuation factor 'a', as described in conjunction with FIG. 1. The attenuated signal is generated by dividing the output voltage (Vout) of the charge pump by the predetermined factor. The attenuated signal is generated using a capacitive attenuator, for example the capacitive attenuator 115 in the voltage regulator 110.

At step 610, the attenuated signal is compared with a reference voltage (Vref) to provide an output. The attenuated signal is received by a comparator, for example the comparator 120 in the voltage regulator 110, at a negative input and the reference voltage is received at a positive input. The reference voltage is received from a reference voltage source and is a stabilized signal representing, in one example, a band gap voltage.

If Vdiv is less than Vref, then the output of the comparator reaches a supply voltage (Vdd), and if Vdiv is greater than Vref, then the output of the comparator reaches a common return or a ground voltage (Vss).

At step 615, an output signal (Vreg) is provided to input of the charge pump, for example a regulated input voltage node, in response to the output. The output of the comparator is provided to a buffer, for example the buffer 125. Non-ideal behavior present in the comparator is eliminated by the buffer. The output signal is generated by buffering the output of the comparator. The output is buffered by one of a Schmitt trigger type buffer and an inverter based buffer. The output signal is used for regulating the output voltage of the charge pump and is dependent on values of Vdiv and Vref.

At step 620, the output voltage of the charge pump is regulated based on the input to the charge pump which is Vreg. The charge pump can use a capacitive charge to develop high voltage Vout at an output voltage node. Vout, the high voltage output of the charge pump, is further used to perform actions, for example erase, rewrite and programming actions, on non-volatile memories.

In some embodiments, one or more steps can be implemented using a controller. The controller includes a processor coupled with a bus for processing information. The controller can also include a main memory, for example a random access memory (RAM) or other dynamic storage device, coupled to the bus for storing information required by the processor. The main memory can be used for storing temporary variables or other intermediate information required by the processor. The controller can also include a read only memory (ROM) or other static storage device coupled to the bus for storing static information for the processor. A storage device, for example a magnetic disk or optical disk, can also be provided and coupled to the bus for storing information. The controller can be coupled via the bus to a display for example a cathode ray tube (CRT), a liquid crystal display (LCD) or a light emitting diode (LED) display, and an input device for communicating information and command selections to the processor.

In one embodiment, the techniques are performed by the processor using information included in the main memory. The information can be read into the main memory from another computer-readable medium, for example the storage unit.

The term "computer-readable medium" as used herein refers to any medium that participates in providing data that causes a computer to operate in a specific fashion. In an embodiment implemented using the controller, various computer-readable medium are involved, for example, in providing information to the processor. The computer-readable medium can be a storage media. Storage media includes both non-volatile media and volatile media. Non-volatile media includes, for example, optical or magnetic disks, for example the storage unit. Volatile media includes dynamic memory, for example the memory. All such media must be tangible to enable the information carried by the media to be detected by a physical mechanism that reads the information into a computer.

Common forms of computer-readable medium include, for example a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the computer-readable medium can be a transmission media including coaxial cables, copper wire and fiber optics, including the wires that include the bus. Transmission media can also take the form of acoustic or light waves, for example those generated during radio-wave and infra-red data communications.

The controller also includes a communication interface coupled to the bus. The communication interface provides a two-way data communication coupling to a network. For example, the communication interface can be a wireless port, Bluetooth port, IrDa port, and wired port. In any such implementation, communication interface sends and receives electrical, electromagnetic or optical signals that carry digital data streams representing various types of information.

The capacitive attenuator 115 used in negative feedback of the high voltage generation system 100 in a memory system reduces power consumption and area, is tunable and easy to operate. A digital input bus can further be used to control the voltage level. Use of the capacitive attenuator 115 hence provides lower cost and reliable non-volatile memories.

In the foregoing discussion, the term "coupled or connected" refers to either a direct electrical connection between the devices connected or an indirect connection through intermediary devices. The term "circuit" refers to either a single component or a multiplicity of components, that are connected together to provide a desired function. The term "signal" refers to at least one current, voltage, charge, data, or other signal.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A high voltage generation system comprising:
 a capacitive attenuator coupled to one or more control voltages and an output voltage of a charge pump and operable to transmit a first signal, the capacitive attenuator comprising:
  a first capacitor coupled to the output of the charge pump; and
  a variable capacitor coupled to the first capacitor, such that a value of the first signal of the capacitive attenuator is determined based in part on a value of a capacitance of the first capacitor relative to a value of a capacitance of the variable capacitor and the output voltage of the charge pump, the value of the capacitance of the variable capacitor being determined at least in part on a value of one or more of the control voltages; and a comparator coupled to the capacitive attenuator and to a reference voltage and operable to transmit a second signal to the charge pump based at least in part on a comparison of the value of the first signal from the capacitive attenuator relative to the reference voltage.

2. The high voltage generation system of claim 1, wherein the reference voltage is coupled to a positive input of the comparator.

3. The high voltage generation system of claim 1, further comprising a switch coupled to an output node of the charge pump and ground.

4. The high voltage generation system of claim 1, further comprising a second switch coupled to the reference voltage and to a negative input of the comparator.

5. The high voltage generation system of claim 1, wherein the variable capacitor comprises:
   a plurality of additional capacitors coupled to the first capacitor; and
   a plurality of additional switches operable to couple one or more of the additional capacitors to ground based at least in part on the value of one or more of the control voltages.

6. The high voltage generation system of claim 1, wherein the output voltage of the charge pump has a slew rate determined at least in part on a time between an update of the value of one or more of the control voltages.

7. The high voltage generation system of claim 1, wherein output voltage of the charge pump is an integral multiple of the reference voltage, the integral multiple being based at least in part on the value of the capacitance of the variable capacitor.

8. The high voltage generation system of claim 1, wherein the comparator is further operable to transmit the second signal based at least in part on the value of the first signal of the capacitive attenuator being higher than the reference voltage.

9. The high voltage generation system of claim 1, further comprising a buffer coupled to the comparator and operable to transmit the second signal to the charge pump.

10. The high voltage generation system of claim 9, wherein the buffer comprises a Schmitt trigger.

11. A method comprising:
    configuring a capacitive attenuator to receive an output voltage of a charge pump and one or more control voltages;
    configuring a capacitance of a variable capacitor of the capacitive attenuator based at least in part on the value of one or more of the control voltages;
    configuring the capacitive attenuator to transmit a first signal to a comparator, the first signal having a value determined at least in part on a value of the output voltage of the charge pump and the capacitance of the variable capacitor relative to a capacitance of a first capacitor coupled to the output voltage; and
    configuring the comparator to transmit a second signal to the charge pump based at least in part on a comparison of a value of the first signal from the capacitive attenuator relative to a reference voltage.

12. The method of claim 11, wherein configuring the capacitance further comprises configuring the capacitive attenuator to couple one or more capacitors of the variable capacitor to ground based on the value of one or more of the control voltages, wherein the capacitance of the variable capacitor is based at least in part on the coupling.

13. A high voltage generation system comprising:
    a voltage regulator comprising:
        a capacitive attenuator coupled to one or more control voltages and an output voltage of a charge pump, the capacitive attenuator being operable to transmit a first signal, the capacitive attenuator comprising:
            a first capacitor coupled to the output of the charge pump; and
            a variable capacitor coupled to the first capacitor, such that a value of the first signal of the first capacitor attenuator is determined at least in part on a value of a capacitance of the capacitor relative to a value of a capacitance of the variable capacitor and the output voltage of the charge pump, the value of the capacitance of the variable capacitor being determined at least in part on a value of one or more of the control voltages; and
        a comparator coupled to the capacitive attenuator and operable to transmit a second signal to a buffer based at least in part on a comparison of the value of the first signal from the capacitive attenuator relative to a reference voltage; and
        the buffer coupled to the charge pump operable to transmit the second signal from the comparator to the charge pump.

14. The high voltage generation system as claimed in claim 13, wherein the buffer comprises a Schmitt trigger.

15. A non-transitory computer readable medium embodying logic that is operable when executed to:
    receive an output voltage of a charge pump and one or more control voltages;
    determine a capacitance of a variable capacitor of a capacitive attenuator based at least in part on a value of one or more of the control voltages;
    transmit a first signal from the capacitive attenuator to a comparator, the first signal having a value determined at least in part on the output voltage of the charge pump and the capacitance of the variable capacitor relative to a capacitance of a first capacitor coupled to the output voltage; and
    transmit a second signal to the charge pump based at least in part on a comparison of a value of the first signal from the capacitive attenuator relative to a reference voltage.

16. The medium of claim 15, wherein the logic is further operable to couple one or more capacitors of the variable capacitor to ground based on the value of one or more of the control voltages, wherein the capacitance of the variable capacitor is based at least in part on the coupling.

17. The medium of claim 15, wherein the reference voltage is coupled to a positive input of the comparator.

18. The medium of claim 15, wherein the logic is further configured to couple an output node of the charge pump to ground through a switch.

19. The medium of claim 15, wherein the logic is further configured to couple to the reference voltage and to a negative input of the comparator through a switch.

20. The medium of claim 15, wherein the logic is further configured to couple a plurality of additional capacitors coupled to the first capacitor through a plurality of additional switches based at least in part on the value of one or more of the control voltages.

21. The medium of claim 15, wherein the logic is further configured to determine a slew rate of the output voltage of the charge pump based at least in part on a time between an update of the value of one or more of the control voltages.

22. The medium of claim 15, wherein the output voltage of the charge pump is an integral multiple of the reference voltage, the integral multiple being based at least in part on a value of the capacitance of the variable capacitor.

23. The medium of claim 15, wherein the logic is further operable to transmit the second signal based at least on the value of the first signal of the capacitive attenuator being higher than the reference voltage.

* * * * *